United States Patent
Takiguchi

(10) Patent No.: US 9,229,667 B2
(45) Date of Patent: Jan. 5, 2016

(54) IMAGE FORMING APPARATUS

(71) Applicant: Akira Takiguchi, Kanagawa (JP)

(72) Inventor: Akira Takiguchi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/332,546

(22) Filed: Jul. 16, 2014

(65) Prior Publication Data

US 2015/0022838 A1 Jan. 22, 2015

(30) Foreign Application Priority Data

Jul. 17, 2013 (JP) .................................. 2013-148621

(51) Int. Cl.
*H04N 1/04* (2006.01)
*G06F 3/12* (2006.01)
*G06K 15/00* (2006.01)

(52) U.S. Cl.
CPC ............ *G06F 3/1231* (2013.01); *G06F 3/1221* (2013.01); *G06K 15/4055* (2013.01)

(58) Field of Classification Search
CPC .. G06F 3/1231; G06F 3/1221; G06K 15/4055
USPC .................................. 358/1.13, 1.15, 1.9, 474
See application file for complete search history.

(56) References Cited

U.S. PATENT DOCUMENTS

| 2010/0257394 A1* | 10/2010 | Koga ..................... G06F 1/3203 713/324 |
| 2011/0273742 A1* | 11/2011 | Takiguchi ..................... 358/1.15 |
| 2012/0275812 A1 | 11/2012 | Takiguchi |
| 2013/0148997 A1* | 6/2013 | Takiguchi ....................... 399/88 |

FOREIGN PATENT DOCUMENTS

| JP | 11-126000 | 5/1999 |
| JP | 2005-088521 | 4/2005 |

* cited by examiner

*Primary Examiner* — Houshang Safaipour
(74) *Attorney, Agent, or Firm* — Oblon, McClelland, Maier & Neustadt, L.L.P.

(57) ABSTRACT

The present invention is concerning an image forming apparatus that has a first power-saving mode in which a power of loads in the apparatus is caused to transition to a sleep state and a second power-saving mode in which supply of power to the loads in the apparatus is stopped, the apparatus comprising: a low power consumption control unit that keeps the power in the second power-saving mode, wherein, in response to an event to cancel the second power-saving mode, the control unit restarts the supply of power to the loads other than the load of an image forming unit while keeping the supply of power to the loads of the image forming unit stopped.

15 Claims, 8 Drawing Sheets

US 9,229,667 B2

IMAGE FORMING APPARATUS

CROSS-REFERENCE TO RELATED APPLICATION(S)

The present application claims priority to and incorporates by reference the entire contents of Japanese Patent Application No. 2013-148621 filed in Japan on Jul. 17, 2013.

BACKGROUND OF THE INVENTION

1. Field of the Invention

The present invention relates to an image forming apparatus that has a power-saving mode.

2. Description of the Related Art

In general, printers tend not to be turned off in offices at the closing time and, in such a case, the standby power that is consumed until the opening time in the next morning is completely waste.

Japanese Laid-open Patent Publication No. 2005-88521 discloses a printer that automatically controls and turns on/off the main power by determining the working time on the basis of the output from an illumination sensor.

Such a conventional printer controls and keeps the power in a normal mode at the time when the main power is turned on automatically but it is rare for users to start using the printer immediately after the main power is tuned on and, in many cases, the printer transitions to a sleep state via a non-operation state.

In other words, conventional printers that automatically turn on/off the main power still consume waste standby power.

In view of the problem of the conventional technology, there is a need to provide a new image forming apparatus that can minimize standby power in the apparatus that automatically turns on/off the main power.

Examinations on a new image forming apparatus that can minimize standby power in the apparatus that automatically turns on/off the main power reached the following configuration, which led to the invention.

SUMMARY OF THE INVENTION

It is an object of the present invention to at least partially solve the problems in the conventional technology.

According to the present invention, there is provided an image forming apparatus that has a first power-saving mode in which a power of loads in the apparatus is caused to transition to a sleep state and a second power-saving mode in which supply of power to the loads in the apparatus is stopped, the apparatus comprising: a low power consumption control unit that keeps the power in the second power-saving mode, wherein, in response to an event to cancel the second power-saving mode, the control unit restarts the supply of power to the loads other than the load of an image forming unit while keeping the supply of power to the loads of the image forming unit stopped.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
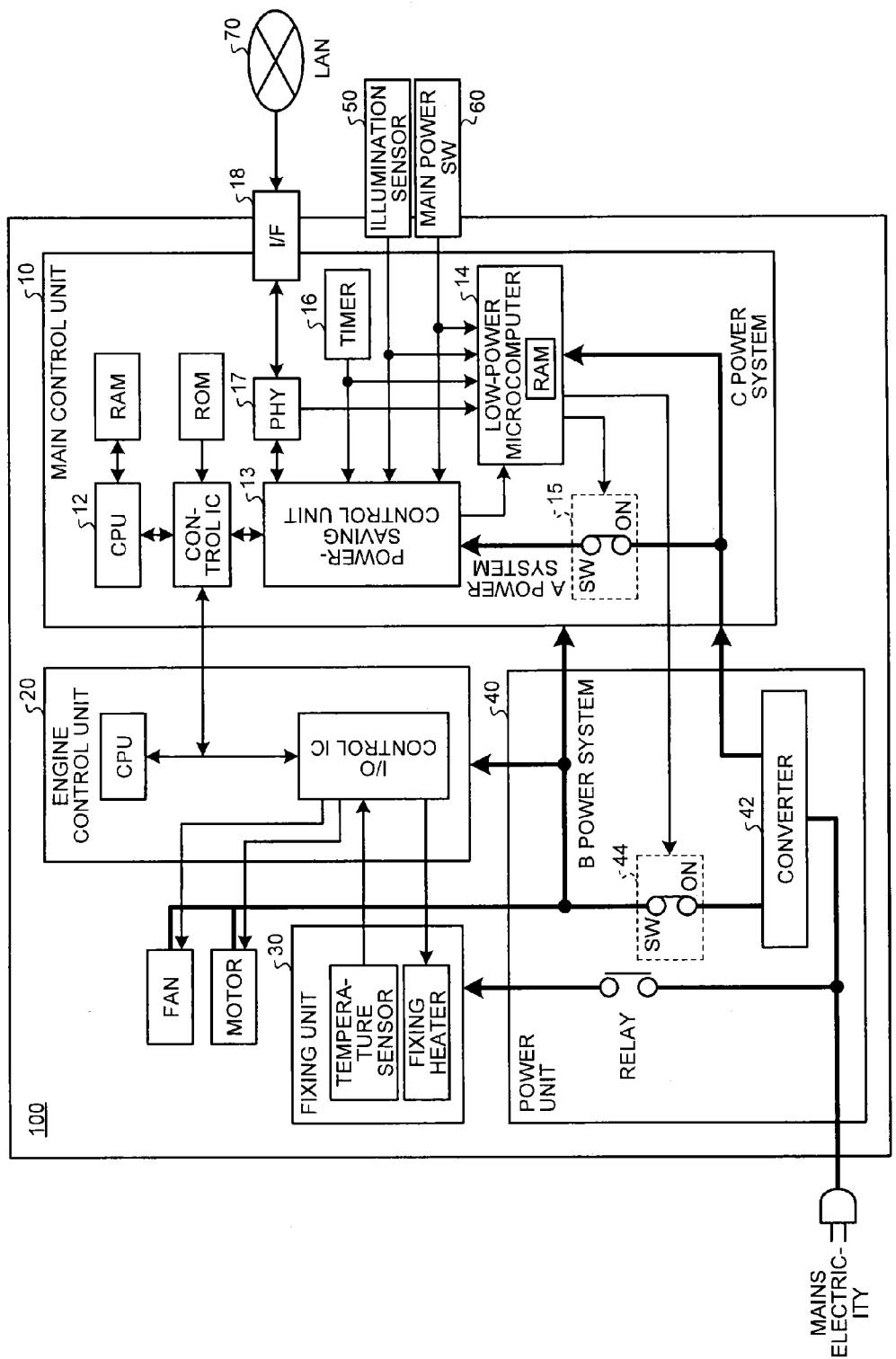
FIG. 1 is a hardware block diagram of an image forming apparatus of an embodiment of the present invention.

The present invention will be described using an embodiment but the present invention is not limited to the following embodiment. The same reference numerals are used for components common between the drawings to be referred to below and the same descriptions will not be given.

FIG. 1 is a hardware block diagram of an image forming apparatus 100 that is an embodiment of the present invention. FIG. 1 (and other drawings) omits a block configuration that does not directly concern the fundamentals of the invention.

As FIG. 1 illustrates, the image forming apparatus 100 of the embodiment includes a main control unit 10, an engine control unit 20, a fixing unit 30, and a power unit 40 that supplies power to each unit.

An image forming unit of the image forming apparatus 100 includes the engine control unit 20 and the fixing unit 30. The image forming unit is a block where the power consumption during operation possibly exceeds 1,000 watts and a large amount of power is consumed in a standby state. The converter 42 of the power unit 40 converts the mains electricity (alternating current (AC) power) to a direct current (DC) power and supplies the DC power to the engine control unit 20 via a switch (SW) 44. This power system will be referred to as the B power system.

In contrast, the main control unit 10 is a function unit that controls the whole image forming apparatus 100 and includes, in addition to a known computing unit, such as a CPU 12, and a memory unit, a power-saving control unit 13 and a low-power microcomputer 14. The converter 42 supplies a DC power to the power-saving control unit 13 via a switch (SW) 15 and the power-saving control unit 13 distributes the supplied DC power to loads in the main control unit 10. This power system will be referred to as the A power system.

The power-saving control unit 13 and the low-power microcomputer 14 cooperate to implement two power-saving modes for power control in the image forming apparatus 100 of the embodiment.

The power-saving control unit 13 solely implements a first power-saving mode. In the first power-saving mode, the loads in the main control unit 10 are caused to transition to a sleep state in response to duration of the non-operation state for a given period or longer. The sleep state corresponds to S3 (Suspend to RAM) of ACPI that provides a power supply control standard. The first power-saving mode is a known mode and thus will not be described more in detail below.

In contrast, the low-power microcomputer 14 implements a second power-saving mode in cooperation with the power-saving control unit 13. In the second power-saving mode, supply of power to both the main control unit 10 and the engine control unit 20 is stopped during an arbitrary period that is desired by a manager (e.g. in a night time).

The low-power microcomputer 14 consists of a low-power consumption microcomputer in order to maximize the standby power and the low-power microcomputer 14 is configured to be supplied with power directly from a power system (referred to as the C power system below) other than the A power system.

The configuration of the image forming apparatus of the embodiment has been described roughly. Here, the power-saving mode implemented in the image forming apparatus 100 will be described specifically using an exemplary case where the image forming apparatus 100 that is set in an office is controlled and kept in the second power-saving mode during the night time (22:00 to 5:00).

When the power supply is controlled and kept in the normal mode (corresponding to SO of ACPI), as illustrated in FIG. 1 previously referred to, both the switch 15 and the switch 44 are turned on to supply power of a given voltage to the loads of the main control unit 10 (the power-saving control unit 13 and the low-power microcomputer 14) and the engine control unit 20.

Figure 2:
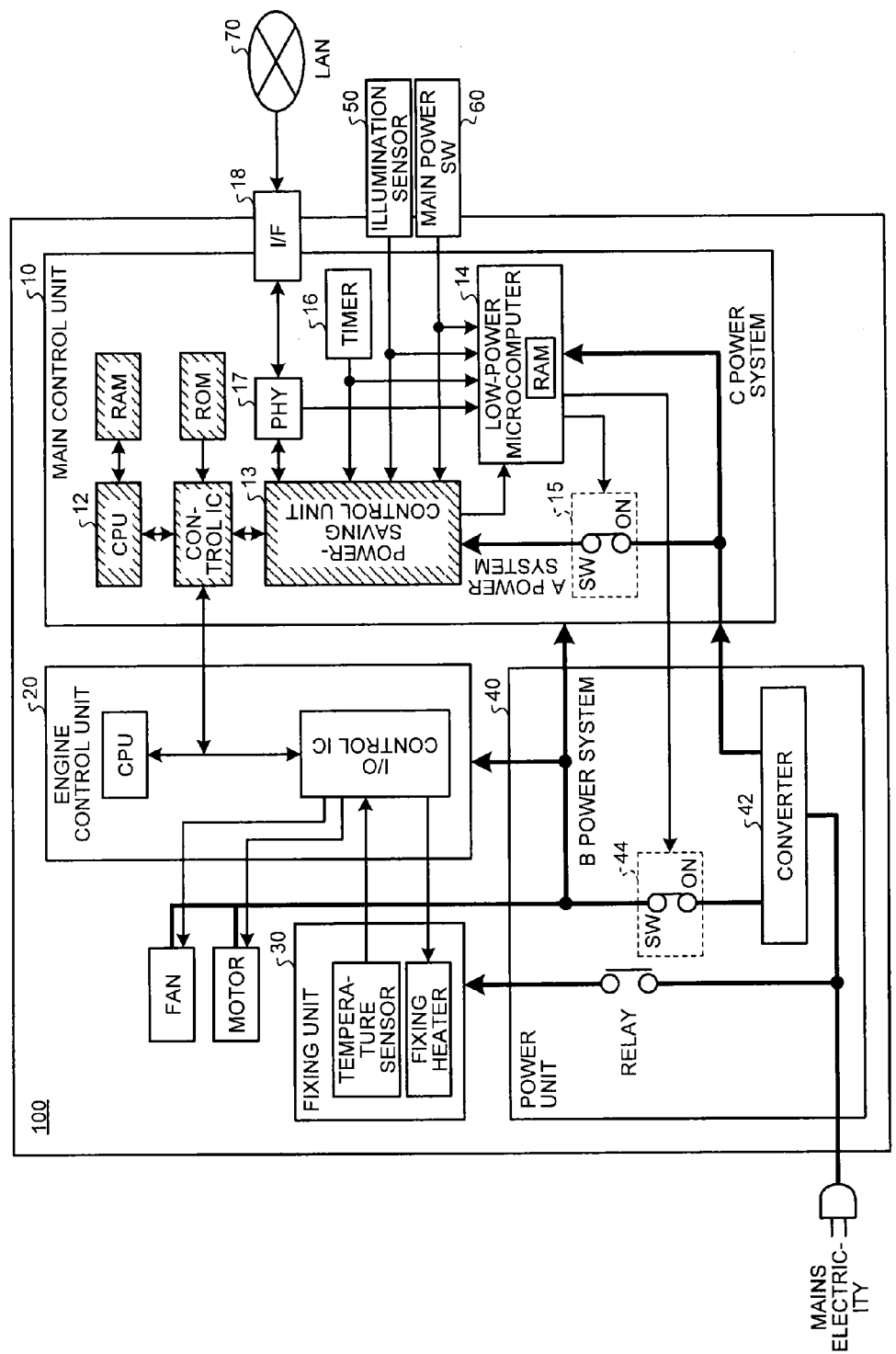
FIG. 2 is a hardware block diagram of the image forming apparatus of the embodiment.

When the non-operation state continues for a given period in the normal mode, the power-saving control unit 13 causes the power of the main control unit 10 to transition to the first power-saving mode. In other words, when there is no one who operates the image forming apparatus 100 after the closing time, the power supply of the main control unit 10 is caused to transition to the first power-saving mode and accordingly the power of the loads hatched in FIG. 2 enters the sleep state.

If the sleep state is maintained until the opening time in the next morning, the standby power during the period is waste. To deal with this, in the embodiment, the power-saving control unit 13 and the low-power microcomputer 14 cooperate to implement the second power-saving mode. The procedure for implementing the second power-saving mode will be described here with reference to the flowcharts of FIG. 3 and FIG. 4.

Figure 3:
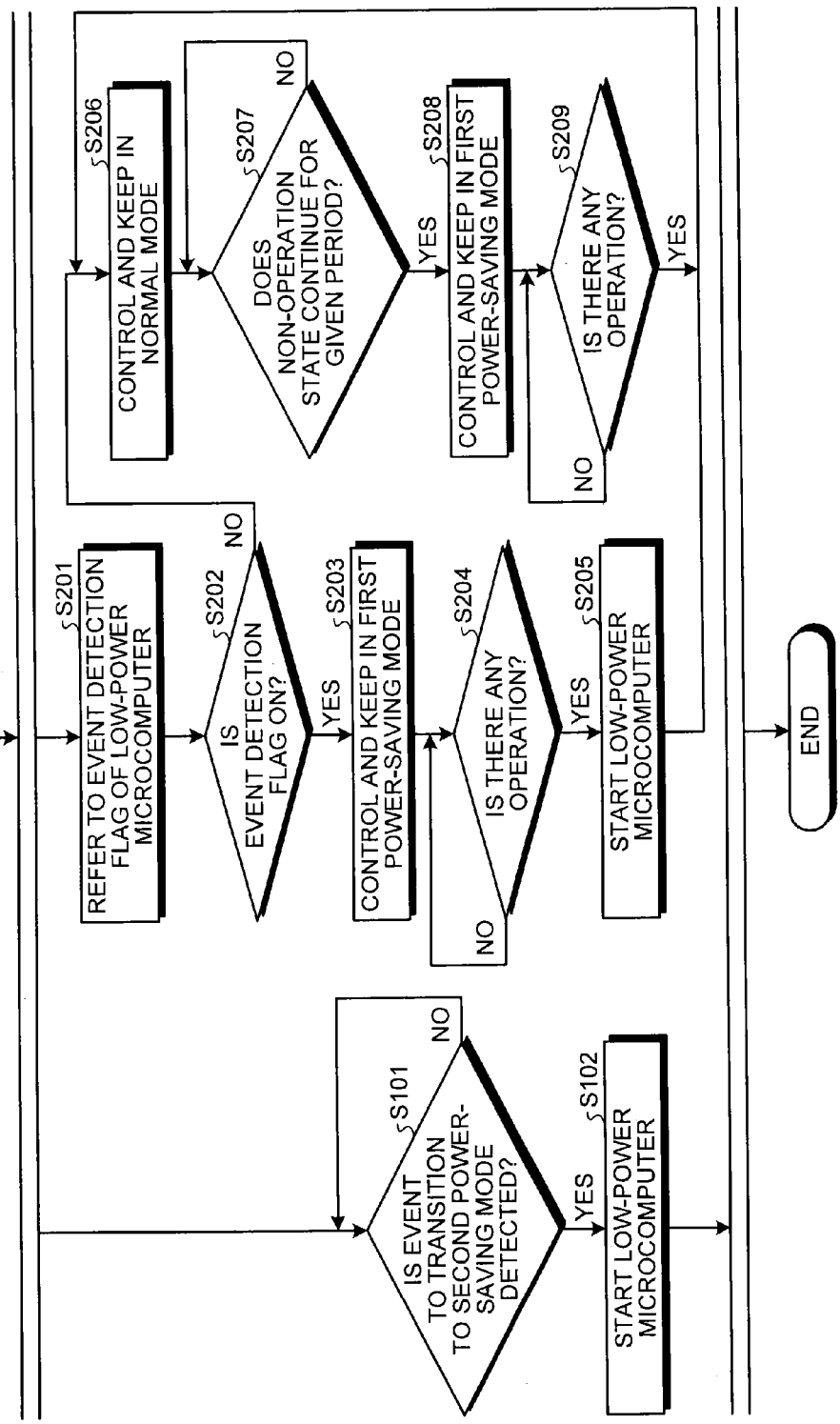
FIG. 3 is a flowchart of a process executed by a power-saving control unit.

FIG. 3 is a flowchart of the process executed by the power-saving control unit 13. In this case where the image forming apparatus 100 is controlled and kept in the second power-saving mode during the night time (22:00 to 5:00), a time when the second power-saving mode starts (22:00) and a time when the second power-saving mode ends (5:00) are previously set in a timer 16.

The power-saving control unit 13, while being on, keeps monitoring for an event to transition to the second power-saving mode (NO at step S101). In this case, a timer event that is generated by the timer 16 at the set starting time (22:00) corresponds to the event to transition to the second power-saving mode (referred to as a transition event). Upon detecting a transition event (YES at step S101), the power-saving control unit 13 goes to step S102 and starts the low-power microcomputer 14.

Figure 4:
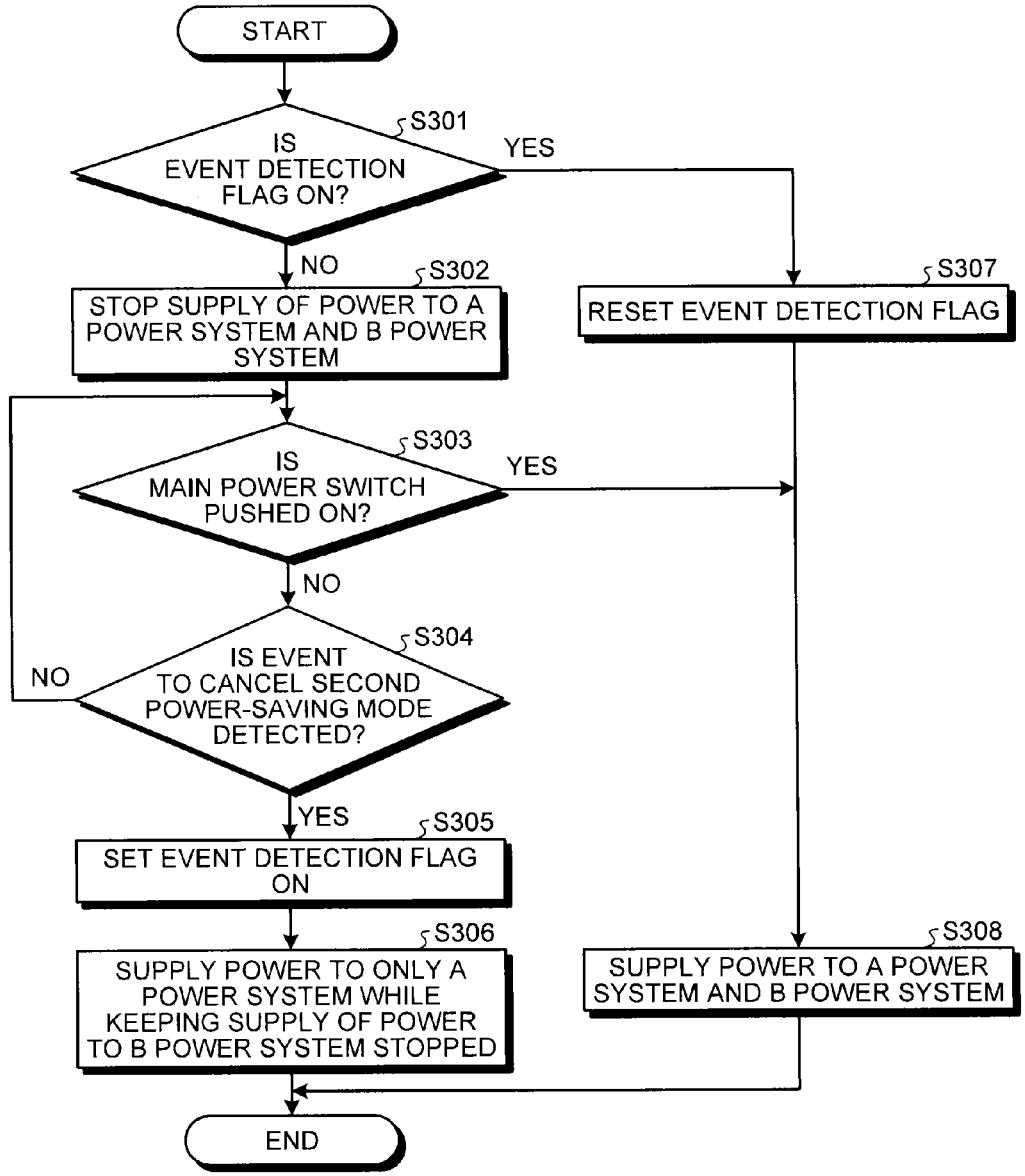
FIG. 4 is a flowchart of a process executed by a low-power microcomputer.
Figure 5:
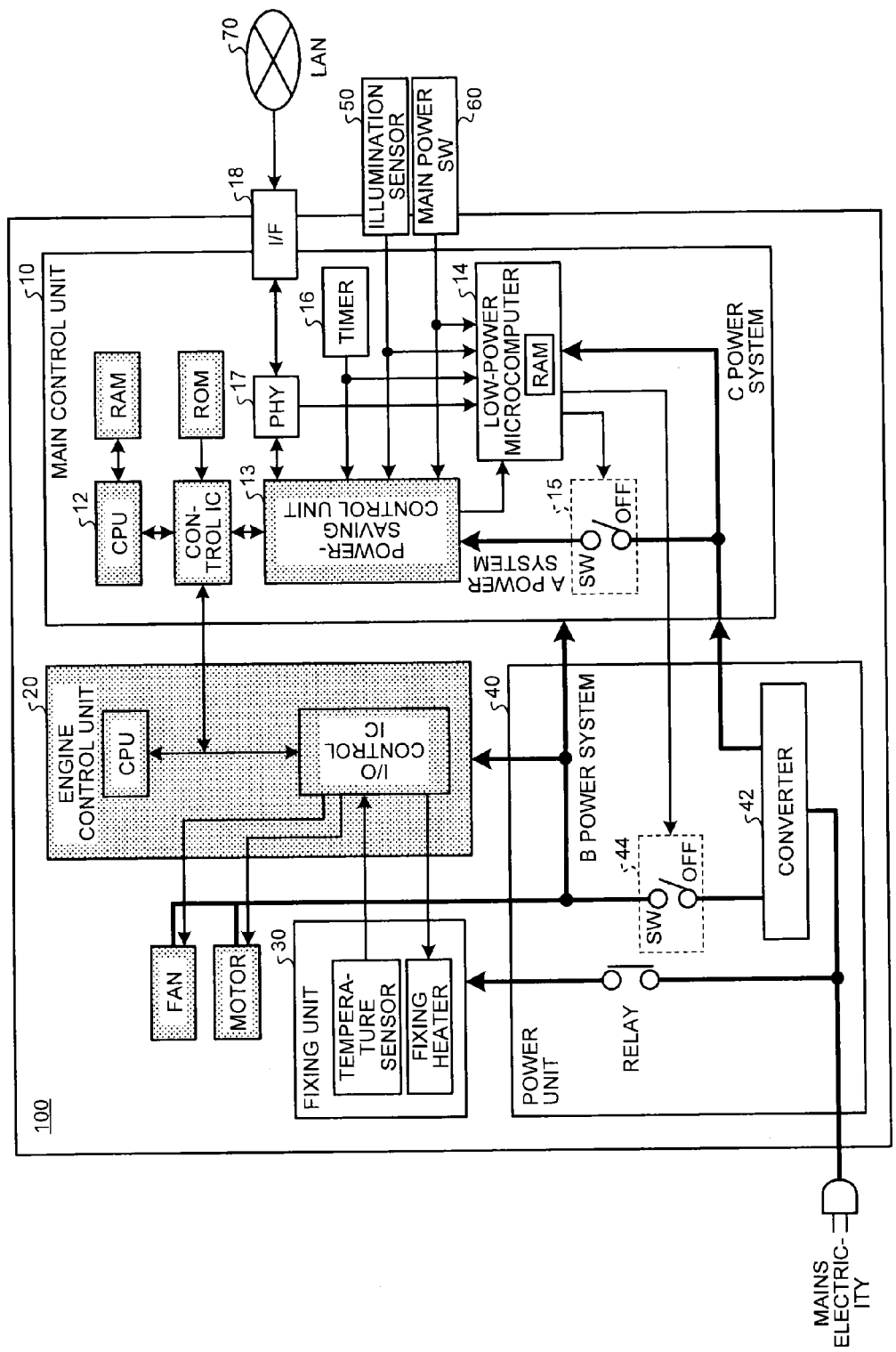
FIG. 5 is a hardware block diagram of an image forming apparatus of the embodiment.

In contrast, FIG. 4 is a flowchart of a process executed by the low-power microcomputer 14. The low-power microcomputer 14 started by the power-saving control unit 13 first determines whether or not its event detection flag (described below) is on (step S301). In this case, because the event detection flag is not on (NO at step S301), the low-power microcomputer 14 goes to step S302 and immediately turns off both the switch 15 of the A power system and the switch 44 of the B power system. As a result, the power supplied to the loads (grayed in FIG. 5) of the engine control unit 20 and the main control unit 10 is stopped.

At the subsequent steps S303 and S304, the low-power microcomputer 14 keeps monitoring for both pushing on of a main power switch (SW) 60 and an event to cancel the second power-saving mode (NO at step S303, NO at step S304). In this case, a timer event that is generated by the timer 16 at the set ending time (5:00) corresponds to the event to cancel the second power-saving mode (referred to as the cancel event below).

Upon detecting a cancel event that is generated at the set ending time (5:00) (YES at step S304), the low-power microcomputer 14 turns on the event detection flag (step S305). In other words, in the embodiment, the event detection flag functions to store the cancel event detection history. The event detection flag can be implemented in the RAM of the low-power microcomputer 14.

Figure 6:
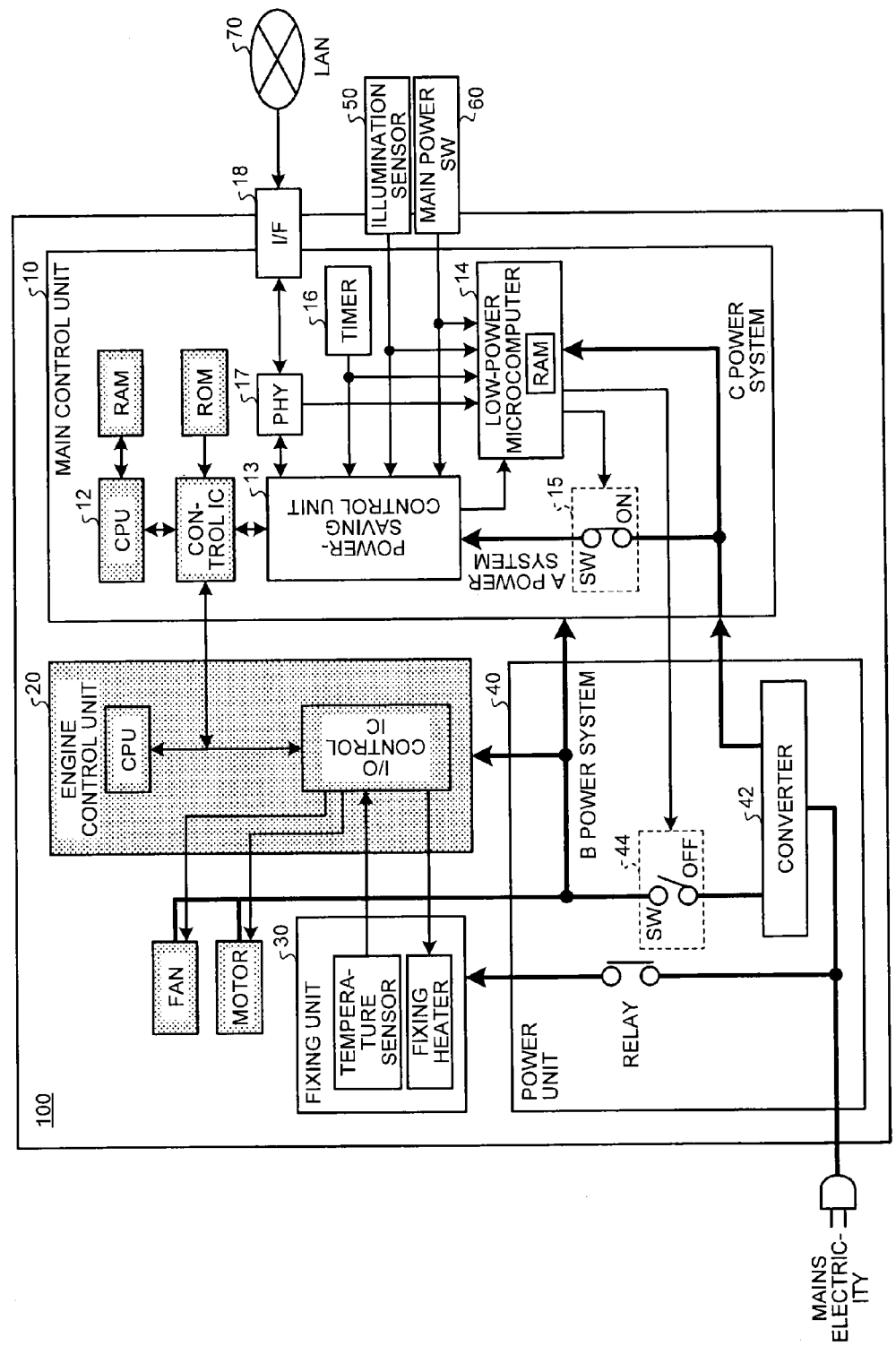
FIG. 6 is a hardware block diagram of the image forming apparatus of the embodiment.

At step S306, the low-power microcomputer 14 controls and turns on only the switch 15 of the A power system (step S306) while keeping the switch 44 of the B power system off and then ends the process. As a result, as illustrated in FIG. 6, the power-saving control unit 13 for which supply of power is restarted starts.

Figure 7:
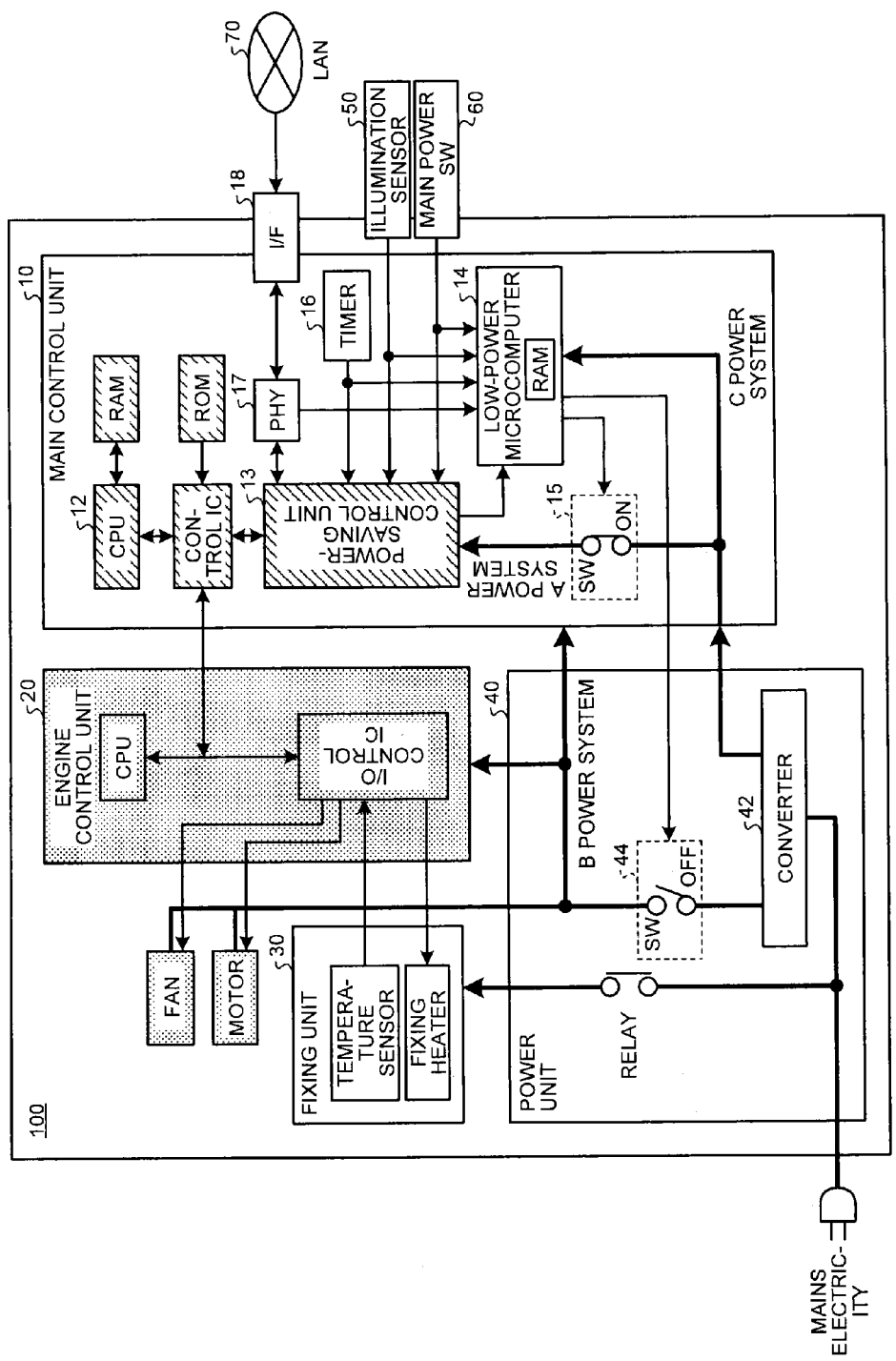
FIG. 7 is a hardware block diagram of the image forming apparatus of the embodiment.

The following descriptions for the process executed by the power-saving control unit 13 refer back to FIG. 3. The power-saving control unit 13 that is started with restarting of the supply of power first refers to the event detection flag of the low-power microcomputer 14 (step S201). In this case, because the event detection flag is on (YES at step S202), the power-saving control unit 13 controls and keeps the power of the main control unit 10 in the power-saving mode (step S203). As a result, as illustrated in FIG. 7, the loads (hatched in FIG. 7) of the main control unit 10 transition to the sleep state. Thereafter, until a user's operation is detected (NO at step S204), the main control unit 10 keeps the sleep state.

As described above, according to the embodiment, the supply of power to the engine control unit 20 is stopped during a period after returning from the second power-saving mode until a user's operation is detected and the main control unit 10 transitions to the sleep state immediately after returning from the second power-saving mode, which minimizes the amount of standby power consumed during the period until the user operates the image forming apparatus 100 for the first time after the returning from from the second power-saving mode at 5:00.

The time further elapses after the returning from the second power-saving mode and, when a user who comes to the office operates the touch panel of the image forming apparatus 100, etc. (YES at step S204), the power-saving control unit 13 starts the low-power microcomputer 14 in response to the operation (step S205).

Thereafter, the power of the main control unit 10 returns from the first power-saving mode and controlled and kept in the normal mode (step S206) and thereafter the following series of processes is executed repeatedly. In other words, the power-saving control unit 13 monitors the time of duration of the non-operation state (NO at step S207) and when the non-operation time continues for a given period or more (YES at step S207), the power-saving control unit 13 controls and keeps the power of the main control unit 10 in the first power-saving mode (step S208). When a user's operation is detected thereafter (YES at step S209), the power of the main control unit 10 returns from the first power-saving mode again and is controlled and kept in the normal mode (step S206).

The following descriptions for the process executed by the low-power microcomputer 14 refer back to FIG. 4. The low-power microcomputer 14 that is started by the power-saving control unit 13 at the previous step S205 determines whether or not its event detection flag is on (step S301). In this case, because the event detection flag is on (YES at step S301), the low-power microcomputer 14 goes to step S307 and rests (turns off) the event detection flag and controls and turns on both the switch 15 of the A power system and the switch 44 of the B power system (step S308). Accordingly, the supply of power to the engine control unit 20 that has been stopped after the returning from the second power-saving mode is restarted so that the image forming apparatus 100 becomes available.

It can be assumed that a user who comes to the office during the night time (22:00 to 5:00) uses the image forming apparatus 100. In such a case, the image forming apparatus 100 is controlled and kept in the second power-saving mode and the main power is off. Thus, the user pushes on the main power switch 60 (mechanical switch).

Figure 8:
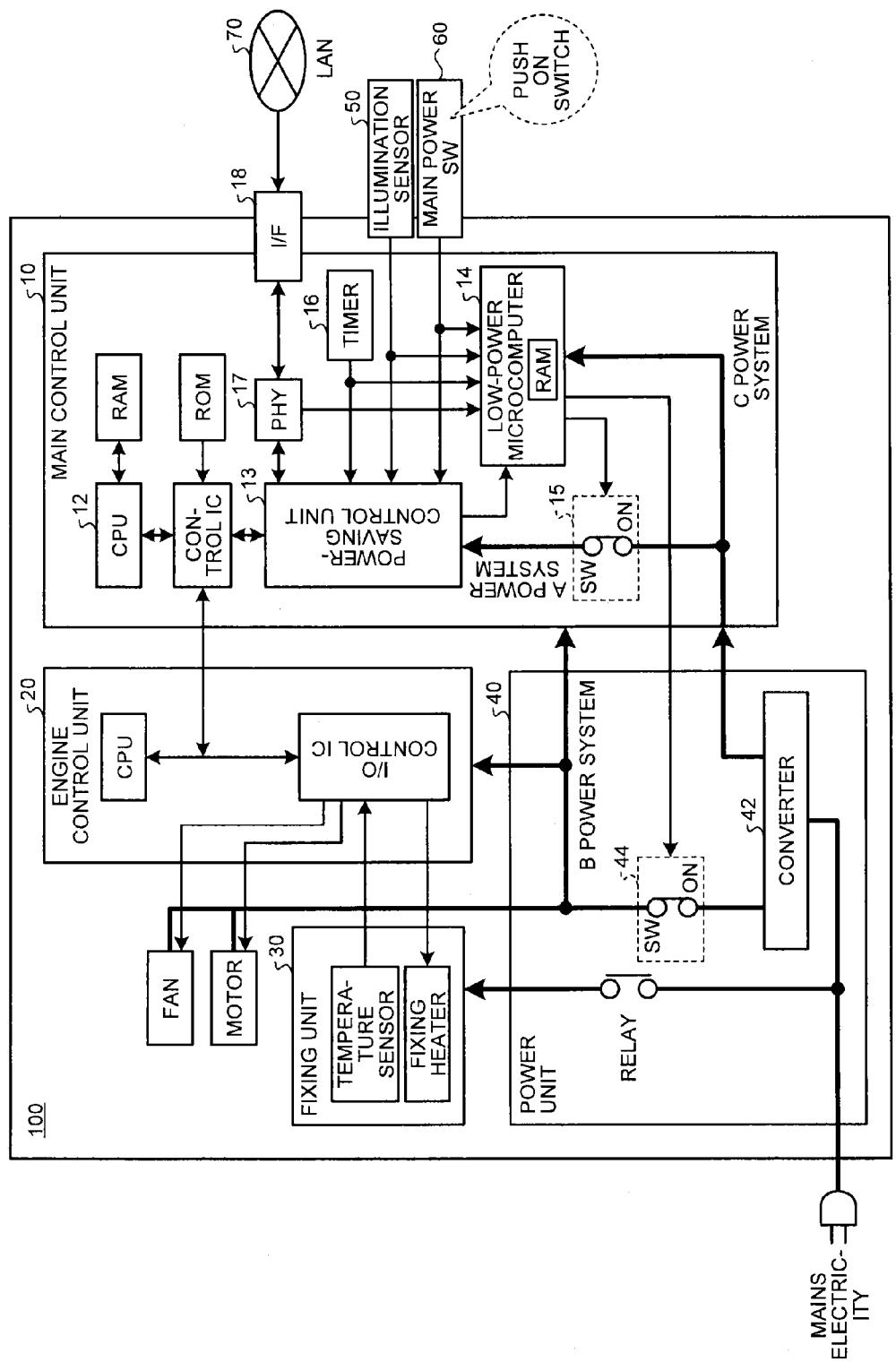
FIG. 8 is a hardware block diagram of the image forming apparatus of the embodiment.

The low-power microcomputer 14 detects that the main power switch 60 is pushed on (YES at step S303) and proceeds the process to step S308. At step S308, both the switch 15 of the A power system and the switch 44 of the B power system are controlled and turned on so that, as illustrated in FIG. 8, power is supplied to both the power-saving control unit 13 and the engine control unit 20.

The following descriptions for the process executed by the power-saving control unit 13 refer back to FIG. 3. The power-saving control unit 13 that is started with the power supplied in response to the user's pushing of the main power switch 60 first refers to the event detection flag of the low-power microcomputer 14 (step S201). In this case, the event detection flag is already reset at the previous step S307 (NO at step S202) the process proceeds to step S206 and the power of the main control unit 10 is controlled and kept in the normal mode.

As described above, according to the embodiment, when a user operates the image forming apparatus 100 during the period in which the image forming apparatus 100 is controlled and kept in the second power saving mode, the image forming apparatus 100 can be made available immediately.

The present invention has been described above on the basis of the embodiment where the image forming apparatus 100 is controlled and kept in the second power-saving mode during the arbitrary period that is set by the manager. The above-described embodiment employs a configuration in which the timer 16 generates a transition event and a cancel event for the second power-saving mode. Alternatively, a configuration may be employed in which an illumination sensor 50 that is mounted in the image forming apparatus 100 generates a transition event and a cancel event for the second power-saving mode.

In such a case, when the lighting in the office in which the image forming apparatus 100 is set is turned off at the closing time, the illumination sensor 50 detects that the brightness of the office turns to be lower than a given level and generates a transition event. The power-saving control unit 13 detects the transition event (see FIG. 3, YES at step S101) and starts the low-power microcomputer 14 (see FIG. 3, step S102). The following process is as described above.

When the lighting of the office is turned on, the illumination sensor 50 detects that the brightness of the office turns to be the given level or higher and generates a cancel event. Upon detecting the cancel event (see FIG. 4, YES at step S304) the low-power microcomputer 14 turns on the event detection flag (see FIG. 4, step S305) and then, while keeping the switch 44 of the B power system off, controls and turns on only the switch 15 of the A power-system (see FIG. 4, step S306). The following process is as described above.

With the above-described configuration, the image forming apparatus 100 controls and keeps the power in the second power-saving mode during the period in which the lighting is off (period in which no office work is assumed) all day and all night. Accordingly, the period in which the power is controlled and kept in the second power-saving mode is maximized to minimize the amount of standby power consumed in the image forming apparatus 100.

Furthermore, if the image forming apparatus 100 has a function of accepting a power control remote operation (e.g. WakeONLAN), a transition event and a cancel event for the second-power saving mode can be generated by an external remote operation.

In this case, the network adapter 17 (PHY 17) is configured to operate with power supplied from the C power system as the low-power microcomputer 14 does and generates a transition event in response to accepting of a power shut down operation from a LAN 70 via an I/F 18. The power-saving control unit 13 detects the transition event (see FIG. 3, YES at step S101) and starts the low-power microcomputer 14 (see FIG. 3, step S102). The following process is as described above.

On the other hand, the network adapter 17 (PHY 17) generates a cancel event in response to accepting of a power-on operation from the LAN 70 via the I/F 18. Upon detecting the cancel event, the low-power microcomputer 14 turns on the event detection flag (see FIG. 4, step S305) and then, while keeping on the switch 44 of the B power system off, controls and turns on only the switch 15 of the A power system (see FIG. 4, step S306). The following process is as described above.

The above-describe configuration makes it possible to externally control the second power saving mode for plural image forming apparatuses 100 integrally without mounting any timer or illumination sensor in each of the image forming apparatuses 100.

The invention has been described using the embodiment but the invention is not limited to the above-described embodiment and any embodiment that can be assumed by those skilled in the art can be within the scope of the invention as long as they lead to the operational advantage of the invention.

Each function of the embodiment can be implemented by a device-executable program that is described with, for example, C, C++, C#, or Java (trademark). The program of the embodiment can be stored in a recording medium that can be read by a device, such as a hard disk device, CD-ROM, MO, DVD, flexible disk, EEPROM, and EPROM, and can be distributed or can be transmitted via a network in a format that can be read by other devices.

As described above, a new image forming apparatus can be provided that can minimize the standby power consumption in the apparatus that automatically turn on/off the main power.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that has a first power-saving mode in which a power of loads in the apparatus is caused to transition to a sleep state and a second power-saving mode in which supply of power to the loads in the apparatus is stopped, the apparatus comprising:
    a low power consumption controller that keeps the power in the second power-saving mode,
    wherein, in response to an event to cancel the second power-saving mode, the controller restarts the supply of power to the loads other than the load of an image forming unit while keeping the supply of power to the loads of the image forming unit stopped, and wherein the event to cancel the second power-saving mode is generated by a timer in which a given time is set.

2. The image forming apparatus according to claim 1, wherein, immediately after the supply of power to the loads other than the load of the image forming unit is restarted, the loads are caused to transition to the sleep state.

3. The image forming apparatus according to claim 1, wherein, in response to switching on of a main power during the second power-saving mode, the power of the apparatus is controlled and kept in a normal mode.

4. The image forming apparatus according to claim 1, wherein, the image forming unit includes an engine control unit that serves as the load.

5. An image forming apparatus that has a first power-saving mode in which a power of loads in the apparatus is caused to transition to a sleep state and a second power-saving mode in which supply of power to the loads in the apparatus is stopped, the apparatus comprising:
   a low power consumption controller that keeps the power in the second power-saving mode,
   wherein, in response to an event to cancel the second power-saving mode, the controller restarts the supply of power to the loads other than the load of an image forming unit while keeping the supply of power to the loads of the image forming unit stopped, and
   wherein the event to cancel the second power-saving mode is generated in response to an illumination sensor's detecting of brightness at a given level or higher.

6. The image forming apparatus according to claim 5, wherein, immediately after the supply of power to the loads other than the load of the image forming unit is restarted, the loads are caused to transition to the sleep state.

7. The image forming apparatus according to claim 5, wherein, in response to switching on of a main power during the second power-saving mode, the power of the apparatus is controlled and kept in a normal mode.

8. The image forming apparatus according to claim 5, wherein, the image forming unit includes an engine control unit that serves as the load.

9. An image forming apparatus comprising:
   a power supply,
   an image forming unit,
   a first controller that is in a sleep state during a first power-saving mode,
   a second controller that allows supply of power from the power supply to the first controller while stopping supply of power from the power supply to the image forming unit during the first power-saving mode, and that stops both of the supplies of power from the power supply to the image forming unit and to the first controller during a second power-saving mode,
   wherein, in response to an event to cancel the second power-saving mode, the second controller allows the supply of power from the power supply to the first controller while stopping the supply of power from the power supply to the image forming unit.

10. The image forming apparatus according to claim 1, wherein, in response to the event to cancel the second power-saving mode, the second controller allows the supply of power from the power supply to the first controller, and then the first controller transitions to the sleep state.

11. The image forming apparatus according to claim 1, wherein, in response to switching on of a main power during the second power-saving mode, the power of the apparatus is controlled and kept in a normal mode.

12. The image forming apparatus according to claim 1, wherein, the image forming unit includes an engine controller.

13. The image forming apparatus according to claim 1, wherein the event to cancel the second power-saving mode is generated by a timer in which a given time is set.

14. The image forming apparatus according to claim 1, wherein the event to cancel the second power-saving mode is generated in response to an illumination sensor's detecting of brightness at a given level or higher.

15. The image forming apparatus according to claim 1, wherein the event to cancel the second power-saving mode is generated in response to a network adapter's accepting of a power-on remote operation.

\* \* \* \* \*